United States Patent [19]

Navato

[11] 4,019,368
[45] Apr. 26, 1977

[54] PICTORIAL ROOM THERMOMETER

[76] Inventor: Jose Miguel Antonio Rosario Navato, 938 Brookvale Terrace, Manchester, Mo. 63011

[22] Filed: Jan. 8, 1976

[21] Appl. No.: 647,009

[52] U.S. Cl. .............................. 73/356; 116/114.5
[51] Int. Cl.² ...................................... G01N 11/12
[58] Field of Search .................... 73/356, 343, 344; 116/114.5, 114 V; 40/28 C, 137, 106.51, 106.52; 23/230 LC; 350/160 LC

[56] References Cited

UNITED STATES PATENTS

| | | | |
|---|---|---|---|
| 509,169 | 11/1893 | Ireland | 73/356 X |
| 3,561,269 | 2/1971 | Seitz | 73/356 |
| 3,619,254 | 11/1971 | Daris | 23/230 P |

Primary Examiner—S. Clement Swisher
Attorney, Agent, or Firm—Gravely, Lieder & Woodruff

[57] ABSTRACT

A device for indicating ambient or room temperature in which the representation of the ambient or room temperature is in terms of specific colors and or shapes incorporated in a picture, instead of the usual digital or numeric way. It consists of a painting or picture with an overlay or painted-on-layer of liquid crystals which serve to cause the picture to change color and or shape in a predetermined way, in relation to specific ambient. Thus, ambient is pictorially depicted and described by this device, instead of the usual digital or numeric and quantitative manner.

The picture upon which the liquid crystals are to be applied on are of dark or black background so that when the temperature is low, relative to the range of temperatures covered by the change of color of the liquid crystals, the unmodified color or and shape of the picture is shown. As the temperature rises to fall within the response range of the liquid crystals, and at predetermined intervals of temperature, the liquid crystals begin to change from their original or initial translucent and colorless state into colorful hues, coincident with their reflection of incident light of varying wave lengths. They then impart added color and or shape to the picture or painting's graphic form or state. The pictorial or graphic change is qualitatively related to the ambient or room temperature in a reversible manner corresponding to the normal ranges of these temperatures.

8 Claims, 4 Drawing Figures

PICTORIAL ROOM THERMOMETER

BACKGROUND OF THE INVENTION

This invention relates to a field of temperature indicating devices, more particularly as applied to the monitoring of room or ambient temperatures by the use of liquid crystals.

Known temperature sensors or thermometers generally consist of colored or opaque liquids such as mercury, enclosed in carefully calibrated glass containers in which the liquids expand and thereby creep up as a thin column along a calibrated transparent tube as they are heated. Some others consist of metal coils to which are attached pointers which are designed to point to calibrations around the coils in the form of dials, advancing around the face of the dials in a circular manner as the metal coil expands and lengthens with increasing heat. These are delicately calibrated and reltively expensive to manufacture. More accurate but more expensive are electonic probes or thermistors.

Liquid crystals have been described and have been used for making room thermometers recently. These crystals are painted or printed on plastic substrates in the form of digital displays. Since they have the property of changing colors at very precise and predetermined temperatures reversibly without appreciable deterioration, they lend themselves for this purpose very advantageously.

All these thermometers indicate and convey the sensed temperature in the form of numeric or digital displays. Readability is limited by the size of the printed number. Electronic activation of electric lights for the purpose of displaying the numbers is complicated and expensive. The digital liquid crystals are not printed in great big sizes for they become unattractive eyesores in a room. They add little to enhance the beauty of rooms. References maybe made to U.S. Pat. Nos. 3,533,399; 3,712,141; 3,661,142; British Pat. Nos. 1,161,039 and 1,138,590.

SUMMARY OF THE INVENTION

Among the several objects of this invention maybe noted the provision of a room temperature sensing and indicating device which does not depend on displays of numbers and instead shows a picture or painting or design painted over with liquid crystals so that it is able to change color and or shape in response to predetermined changes of room temperature, and by so doing indicates such changes by a designed characteristic color and or shape change. The thermometer appears essentially as a frame painting or picture and is by itself also a form of room decoration. The designed changes of shape and or color with changes of temperature are easier to percieve visually and act to enhance readability of the signaled changes of room temperature while at the same time these signals remain pleasing to observe. Other objects of the invention other than those above and other features of the device will be in part apparent and in part pointed out herein after.

Briefly, a room thermometer of this invention is adapted to be displayed as a room decoration in the form of a picture or painting and is either framed in the conventional manner for hanging on walls or can be provided with a rigid backing and support as to be capable of being stood up on a flat surface such as a table or dresser top. The substrate on which the painting is painted or on which the picture is printed can either be of paper or of canvas or of any other substrate suitable for this purpose as is well known to those knowledgable to the art. The specific areas which form a part of the picture or painting upon which the liquid crystals are to be applied is of dark color such as black in order to provide a sharp contrast to the activated liquid crystals. A protective clear coating is applied to the painting or picture after the liquid crystals are painted on.

DESCRIPTION OF THE PREFERRED EMBODIMENTS

Figure 1:
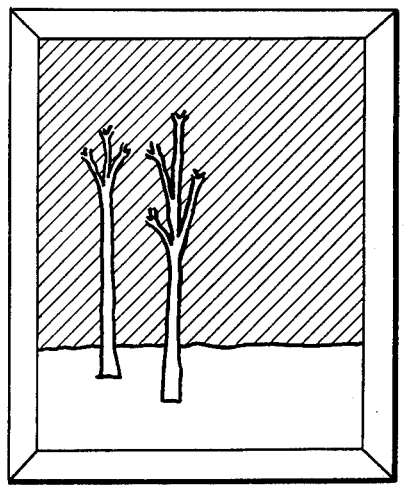
FIG. 1 is a scaled down illustration of the room thermometer of this invention as it would appear at room temperatures lower than the lowest temperature at which the liquid crystals become color responsive showing in this particular example of the painting, trees which are almost bare of leaves, framed over a dark background, and illustrates pictorially, a winter scenario suggestive of a cold temperature.
Figure 2:
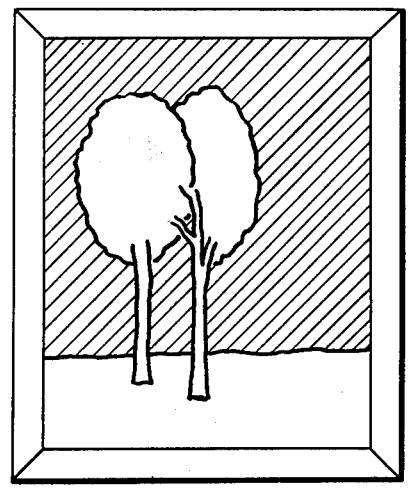
FIG. 2 is a scaled down illustration of the above painting as it would appear at temperatures above the lowest responsive range of the liquid crystals and below the highest temperature at which the liquid crystals are able to reflect the color indigo or deep blue and now showing foliage on the same trees. The colors of the leaves are in red to brown at the lower range of the response range of the liquid crystals indicating Fall temperatures and green leaves or foliage as the room temperature rises up further and approaches the upper limits of the response range of the liquid crystals, indicating warm and Spring like or Summer temperatures.
Figure 3:
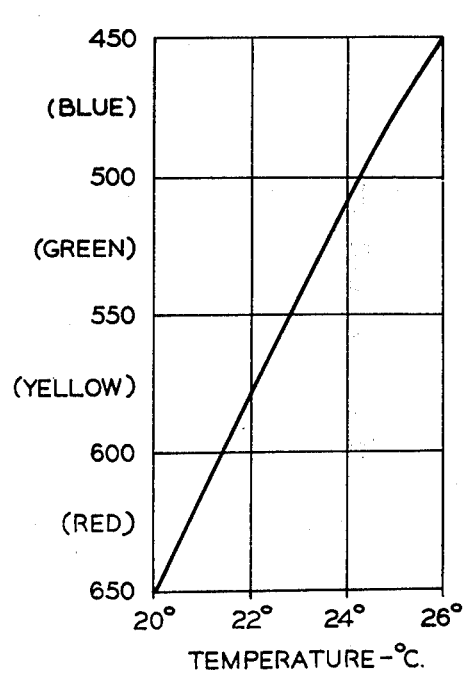
FIG. 3 is a graph showing the wave length of light reflected from the formulation W-20° Centigrade of liquid crystals as a functin of temperature.
Figure 4:
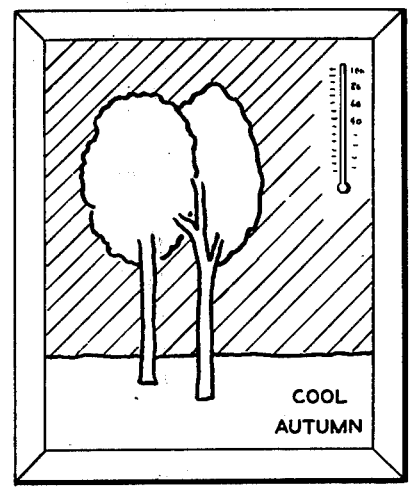
FIg. 4 is an illustration of the painting shown in FIGS. 1 and 2 and modified to include a conventional thermometer and words descriptive of a particular temperature, those words being written in liquid crystals which turn visible at the temperature described by the words.

Referring now to the drawings, a room thermometer of this invention is shown in its entirety and is shown to be adapted for hanging up on a wall. The substrate is canvas stretched on cardboard and gesso primed for oil painting then spray painted flat black using in one instance, flat black epoxy paint commercially available from Pactra Industries of Los Angeles, Calif. under their trade name SUPER EPOXY ES-11. The figures and the ground is painted on by brush strokes using Bellini artist's oil colors in pure linseed oil as manufactured and guaranteed by Bocour Artists Colors, Inc. of Garnerville, N.Y. After the figures or designs are painted on and in this instance showing trees which are bare of leaves, the painting is allowed to dry for about two weeks before liquid crystals are painted on with a paint brush. On lithograph prints, the liquid crystals can be applied using the silk screen process. The liquid crystals used are the encapsulated liquid crystals (ELC) manufactured and marketed by NCR Capsular Products of Miamisburg, Ohio under the trade name Chameleon. In one instance, a formulation suitable for indicating room temperatures in St. Louis, Missouri in winter, inside a gas-heated-forced-air house, is the Chameleon W-20 which is clear at temperatures below 20° centigrade and turns into rust or red at 20° centigrade. The crystals continue to change color from red to yellow, from yellow to green, and from green to blue thru the 6° cetigrade range of response starting at 20° specific for this formulation. The usual ranges of room temperature in a house such as above described is usually within this range.

The liquid crystals may be painted over a portion of the design previously painted in oil so that when the temperature reaches the active range for the crystals, the painted over portion of the design will be obscured.

Typically, the liquid crystals are made by mixing specific amounts of cholesterol esters such as chloresteryl crotonate, cholesteryl oleate, cholesteryl butyrate, chloesteryl nonanoate, cholesteryl chloride, and others. The NCR process involves the emulsification of these cholesteryl esters in varying proportions in gelatin then stabilized by the addition of a gelatin hardener after which the encapsulated liquid crystals formed are washed before resuspension to a standard slurry of about 20% encapsulated liquid crystals.

Other thermochromic materials are known and described such as those used by Seitz in his thermochromic temperature indicator of which reference can be made to U.S. Pat. No. 3,561,269. Specifically, these solid thermochromic materials are compounds formed by reacting $Ag_2HgI_4$ with bromine under specified temperatures and have the property of changing color from yellow to red-orange within its temperature response range. These are suspended and applied by standard means to comprise a part of the design of this invention herein being described.

The liquid crystals or the thermochromic materials are sprayed with a transparent or clear laquer spray such as in this instance LUCITE SPRAY by DU PONT Clear 2404c which is commercially available at department stores. Other clear protective coatings maybe used such as SARGENT ACRYLIC GEL a product of Westab of Dayton, Ohio, a division of Mead corporation, applied by brushing on. The clear coating serves to protect the thermometer from abrasion and the liquid crystals from the destructive effect of moisture.

A standard wooden frame is used to make the thermometer suitable for hanging on walls and are available at department stores.

Another embodiment of the invention is to add to the thermometer picture or painting, a standard room thermometer or a digital liquid crystal thermometer for more accurate determination of the room temperature. Still another embodiment of the invention is comprised of printing a word or series of words on the picture or painting, over a dark or black background using liquid crystals with different characteristic transition temperatures so that brief literal descriptions of the specific ambient or room temperature, corresponding to the particular kind or formulation of liquid crystals used, will appear and become clearly readable. As the range of response of one kind of liquid crystals is exceeded by the temperature, another literal and briefly descriptive word or words different from those formerly visible, will appear, as the result of the printing of the second description using a different formulation of liquid crystals whose transition temperature occurs at a temperature in which the first liquid crystal formulation begins to fade into the dark background. Thus words such as Winter Cold can be printed with a liquid crystal formulation like Chameleon W-14° Centrigrade (by NCR) which turns visible from 14° to about 18° C. As the room temperature approaches 20° C., the words Cool Autumn will begin to appear when these words are printed with liquid crystals such as Chameleon R-20° C. and are activated at about 20° C. The words Cool Autumn will begin to fade at about 24° C. and a third descriptive word or words such as Sring comfort will then appear in its place when these words are printed using Chameleon formulation W-24° C. This description will remain visible until the room temperature exceeds the W-24° C. formulation's response range which is about 30° C.

In view of the above it will be seen that the several objects of the invention are achieved and other advantageous results attained.

As various changes could be made in the above construction without departing from the scope of the invention it is intended that all matter contained in the above description or shown in the accompanying drawings shall be interpreted as illustrative and not in any limiting sense.

What is claimed is:

1. A thermometer adapted to be hanged up on walls or stood up on flat surfaces to pictorially and graphically indicate the temperature of the room or environment comprising a substrate on which is painted or printed a design, a black or dark background, an overlay or painted on layer of liquid crystals over designed areas of the picture or painting or the first mentioned design, which liquid crystals change color in response to changes of room or ambient temperature in a predetermined temperature range and causing a change in the color and or shape of the original design, and a standard room thermometer incorporated in the picture or design for more precise temperature determination.

2. A thermometer adapted to be hanged up on walls or stood up on flat surfaces to pictorially and graphically indicate the temperature of the room or environment comprising a substrate on which is painted or printed a design, a black or dark background, an overlay or painted on layer of liquid crystals over designed areas of the picture or painting or the first mentioned design, which liquid crystals change color in response to changes of room or ambient temperature in a predetermined temperature range and causing a change in the color and or shape of the original design, and a set of printed word or words literally providing a brief description of the room or ambient temperature, using liquid crystals of different formulations for each word or set of words used for each specific description of the room temperature being sensed such that the word or set of words visible at any moment is correlated to the quality of the room temperature at that particular moment.

3. A device for indicating ambient temperature, said device comprising: a substrate; a first illustration on the substrate and made from a material which remains the same hue irrespective of changes in the ambient temperature; a second illustration on the substrate and coordinated with the first illustration to provide an overall illustration, the second illustration being formed from a thermochromic material which is indistinguishable from the substrate when below a prescribed temperature and within an active range immediately above the prescribed temperature changes color in response to changes in the ambient temperature, whereby the second illustration is visible in the active range and a change in the ambient temperature within the active range is indicated by a change in the appearance of the overall illustration; and a protective coating applied to the substrate and extended over at least the thermochromic material of the second illustration so as to protect the thermochromic material, the protective coating being transparent.

4. A device according to claim 3 wherein the overall illustration is of a subject which would be expected to change appearance with changes in the seasons.

5. A device according to claim 4 wherein the: overall illustration includes deciduous trees, and the second illustration is the leaves of such trees.

6. A device according to claim 3 wherein the second illustration obscures a portion of the first illustration when the temperature is within the active range, but not when the temperature is below the prescribed temperature.

7. A device according to claim 3 wherein the thermochromic material is encapsulated liquid crystals.

8. A device according to claim 3 wherein the thermochromic material is formed by reacting $Ag_2HgI_4$ with bromine.

* * * * *